US009034437B1

(12) United States Patent
Randazzo et al.

(10) Patent No.: US 9,034,437 B1
(45) Date of Patent: May 19, 2015

(54) METHOD AND APPARATUS FOR A COATING PROCESS FOR THE DEPOSITION OF A FLUENT COATING ONTO A THREE-DIMENSIONAL SURFACE

(71) Applicants: Jeffrey A. Randazzo, Parkland, FL (US); John R. Rastetter, Cumming, GA (US)

(72) Inventors: Jeffrey A. Randazzo, Parkland, FL (US); John R. Rastetter, Cumming, GA (US)

(73) Assignee: CONTROLLED DISPLACEMENT TECHNOLOGIES, LLC, Boynton Beach, FL (US)

( * ) Notice: Subject to any disclaimer, the term of this patent is extended or adjusted under 35 U.S.C. 154(b) by 109 days.

(21) Appl. No.: 13/745,172

(22) Filed: Jan. 18, 2013

Related U.S. Application Data

(60) Provisional application No. 61/588,742, filed on Jan. 20, 2012.

(51) Int. Cl.
*B05D 1/28* (2006.01)
*B05C 1/08* (2006.01)

(52) U.S. Cl.
CPC ............. *B05D 1/28* (2013.01); *B05C 1/0817* (2013.01)

(58) Field of Classification Search
CPC ........................................................ B05D 1/28
USPC ..................................................... 427/428.14
See application file for complete search history.

(56) References Cited

U.S. PATENT DOCUMENTS

| RE8,460 | E | * | 10/1878 | Hammerschlag | 427/358 |
|---|---|---|---|---|---|
| 3,518,142 | A | * | 6/1970 | Dooley | 156/205 |
| 4,806,183 | A | | 2/1989 | Williams | |
| 5,275,657 | A | | 1/1994 | Duffy et al. | |
| 6,247,403 | B1 | | 6/2001 | Randazzo | |
| 2002/0108563 | A1 | | 8/2002 | Yoshida | |
| 2005/0194103 | A1 | * | 9/2005 | Kohler | 156/494 |

FOREIGN PATENT DOCUMENTS

WO        9707899        3/1997

* cited by examiner

*Primary Examiner* — Nathan Empie
(74) *Attorney, Agent, or Firm* — Malin Haley DiMaggio & Bowen, P.A.

(57) ABSTRACT

A method and system for applying and coating a cushion with adhesive for mounting the cushion between a plate cylinder surface and a flexographic plate surface whereby the adhesive is applied to the tips of the protrusions that make up the structure of the cushion. The cushion, mounted between the plate cylinder surface and the flexographic plate base, is typically glued to both the cylinder surface and to the flexographic plate surface. The apparatus and process of the instant invention provide for a consistent and uniform application of a heavy deposition of said fluent coating whereby the majority of the deposition of said fluent coating resides on the upper/outer most surface of the three-dimensional work or substrate being coated resulting in a coat weight of 50% or greater then prior art coating apparatus.

3 Claims, 7 Drawing Sheets

FIG. 1-A 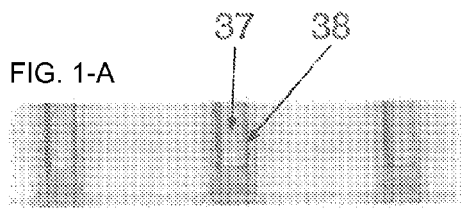
FIG. 1-B 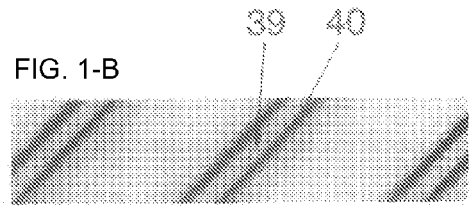
FIG. 2-A 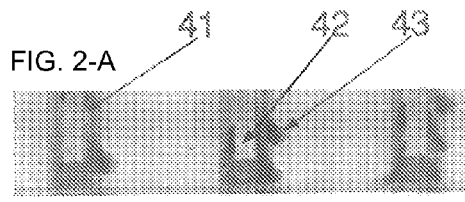
FIG. 2-B 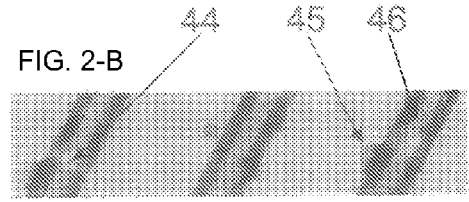
FIG. 3-A 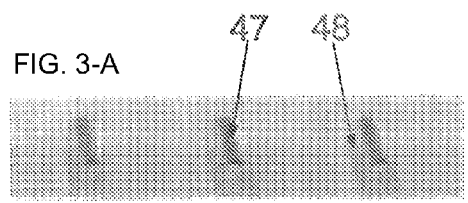
FIG. 3-B 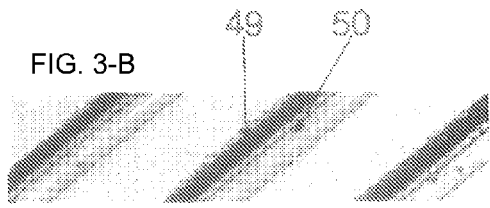

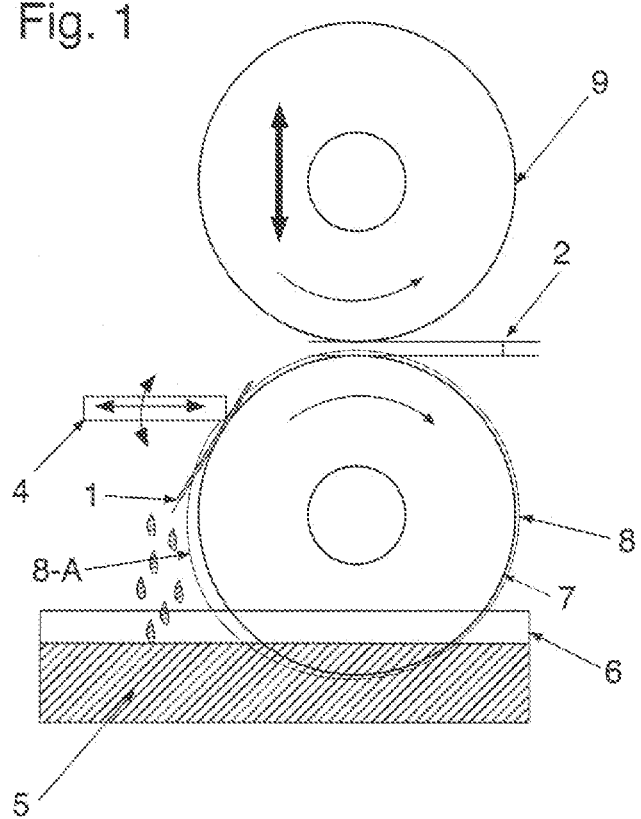

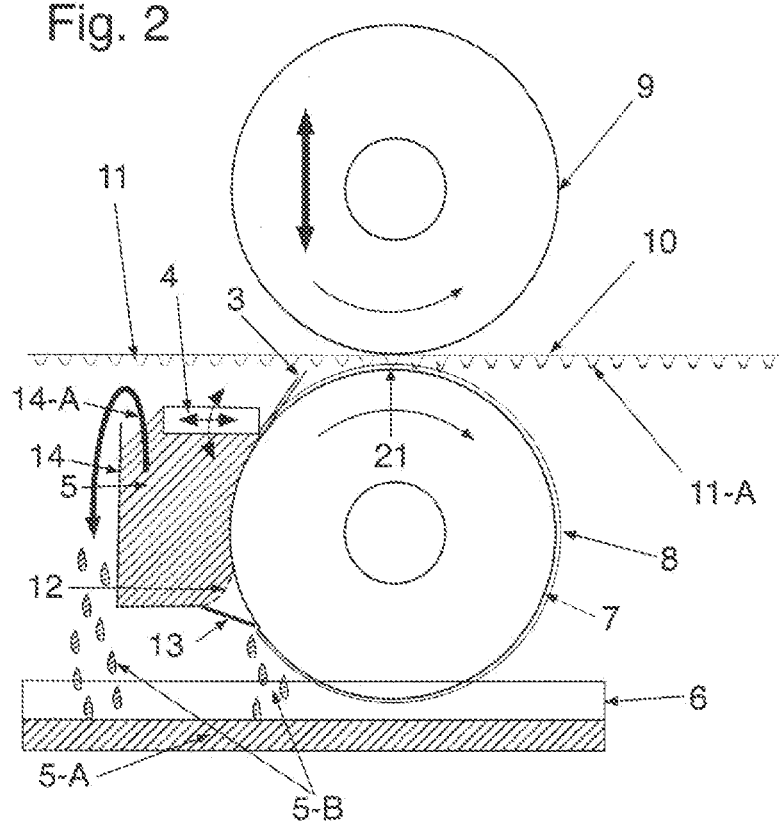

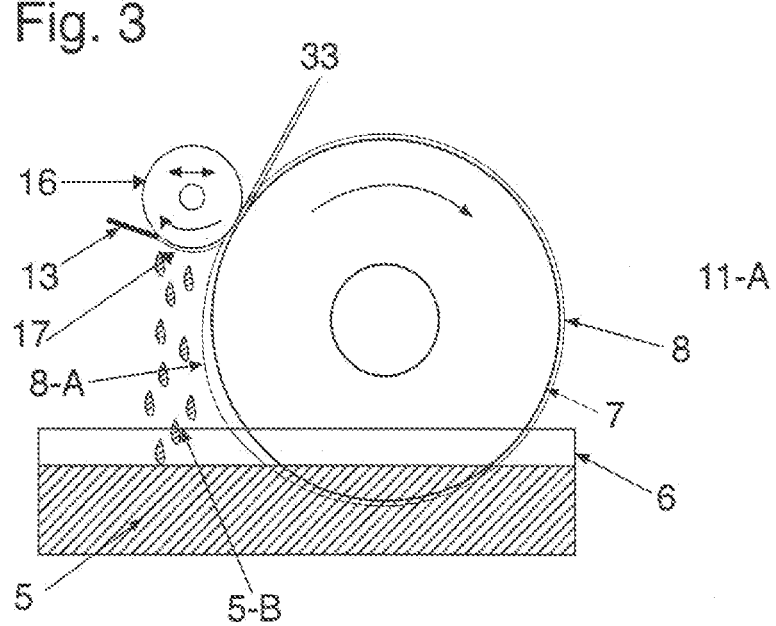

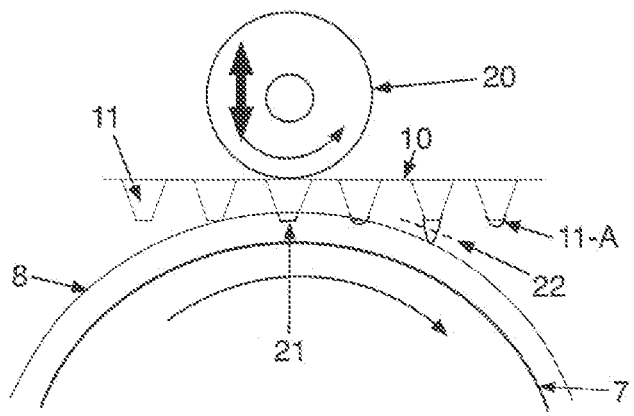
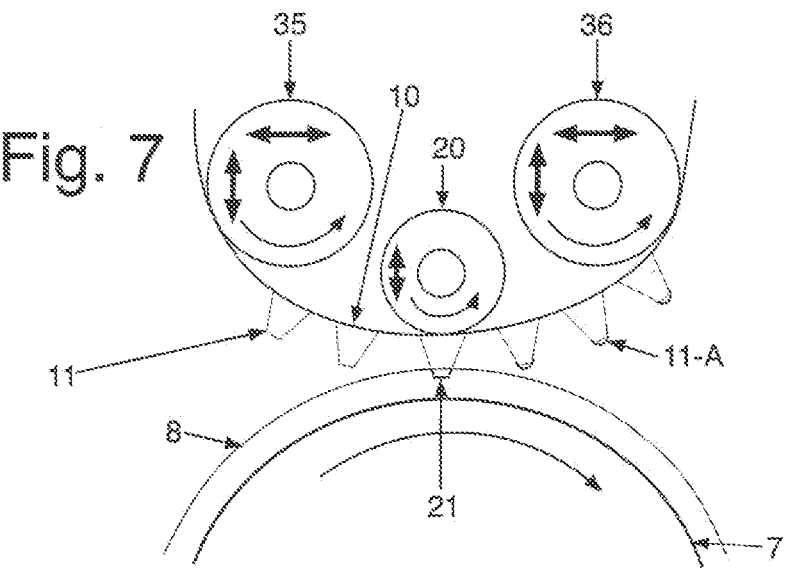

METHOD AND APPARATUS FOR A COATING PROCESS FOR THE DEPOSITION OF A FLUENT COATING ONTO A THREE-DIMENSIONAL SURFACE

CROSS REFERENCE TO RELATED APPLICATIONS

This application claims the benefit of priority of U.S. Provisional Patent Application Ser. No. 61/588,742, filed on Jan. 20, 2012.

Method and Apparatus for a coating process for the deposition of a fluent coating onto a three-dimensional surface, incorporating by specific reference the complete disclosure in U.S. Pat. No. 6,247,403 B1.

The system and method of this invention provide for applying and coating a three dimensional cushion with adhesive for mounting the cushion between a plate cylinder surface and a flexographic plate surface as described in U.S. Pat. No. 6,247,403. The adhesive is applied to the tips of the protrusions that make up the structure of the cushion.

BACKGROUND OF THE INVENTION

1. Field of the Invention

This invention relates to the coating of any fluent, directly onto any three-dimensional web surface resulting in a high coat weight deposition of said fluent coating to mainly reside on the upper/outer most surface of said three-dimensional object, including the apparatus required to meter and transfer the fluent coating.

The method and system of this invention provide for applying and coating a cushion with adhesive for mounting the cushion between a plate cylinder surface and a flexographic plate surface as described in U.S. Pat. No. 6,247,403. The adhesive is applied to the tips of the protrusions that make up the structure of the cushion.

2. Description of Prior Art

Fluent coating applies broadly to many processes, in many industries, including, many categories of prior art used for coating a continuous web. Most are used for the coating of a two-dimensional surface including most commonly, Direct Gravure, Reverse Gravure, Reverse Roll, Slot Die/Curtain Coating, Spraying, Brushing, each of which may contain multiple iterations including the ability to restrict the area in which the fluent coating is being applied, including masking, pattern coating, and other various techniques.

1) Brushing is a coating process whereby a brush is dipped into a fluent coating and the saturated brush comes in direct contact with the work or substrate being coated, in this method there is no cost-effective means to restrict the coating from flowing down the sides of the three-dimensional object, or filling the voids between the three-dimensional object.

2) Spraying is a coating process whereby the fluent coating is dispensed through a nozzle under pressure resulting in a mist of the fluent coating being applied to the work or substrate, as in brushing there is no cost-effective means to restrict the coating to just the tips of the three-dimensional profile.

3) Slot Die/Curtain Coating, is a coating process comprised of a fixture containing the fluent coating and is typically positioned above the web, the bottom of the fixture containing the fluent coating contains an opening that can be controlled to regulate the volume of fluent coating being dispensed, this process is designed to deliver a uniform coating to the work or substrate and is not capable of restricting the application of the fluent to just the tip of the three-dimensional profile. The result is an overall coating and an undesirable volume of fluent deposition between the three-dimensional elements.

4) Direct gravure, is a coating process that relies on an engraved roller with a particular pattern of a particular geometric size, depth, shape and distance apart to retain the fluent coating for the purposes of transferring that coating directly onto the work or substrate surface. The engraved cells are specifically engineered to take into consideration the viscosity of the fluent coating and the resulting desired coat weight required to be applied to the surface of the work or substrate. In this process the fluent coating is metered into the cells of the "anilox roll" (engraved roller), most commonly by sitting in a bath of the fluent coating or the fluent coating is delivered to the anilox roll via an enclosed doctor blade system, in both cases a flexible metering blade comes into contact with the anilox surface, and is used to wipe the surface of the roll clean while maintaining the fluent coating in the engraved cells.

5) Reverse Gravure, is a coating process that utilizes similar coating apparatus as Direct Gravure (described in greater detail in, 4 above) whereby the application roll runs in the reverse direction of the work or substrate and requires kiss contact of the work or substrate being coated and is specifically designed to smear the fluent coating onto said work or substrate being coated. As in direct gravure, the fluent coating is metered via an anilox roll in conjunction with a flexible metering blade used to wipe the surface of the anilox roll clean while maintaining the fluent coating in the engraved cells.

6) Reverse roll, is a coating process typically comprised of 3 rolls in which the application roll is partially submerged into a slurry of fluent coating and said fluent coating is metered onto the application roll through a predetermined gap created between the application roll and the metering roll and said metering roll rotates in the reverse direction of the application roll, resulting in a uniform wet film thickness on the application roll, and whereby the application roll runs in the reverse direction of the web in order to transfer the fluent coating onto the work or substrate. The reverse direction of the application roll is designed to smear the fluent coating onto the work or substrate to minimize or eliminate coating defects caused by machine tolerance errors and or air bubbles in the fluent coating.

International Patent Application Publication No. WO 1997/007899 A1 to Iafrate discloses a "reverse gravure kiss coating system with output roller", included in said application are drawings depicting multiple configurations of gravure coating processes including; direct gravure, differential speed gravure, reverse gravure, gravure kiss coater, and offset gravure coating configurations, all of which rely on cells engraved into the anilox roll in conjunction with a flexible metering blade used to wipe the surface of the anilox roll clean while maintaining the fluent coating in the engraved cells.

U.S. Pat. No. 5,275,657 to Duffy discloses a direct gravure application resulting in a thin layer of adhesive fluent to the tips of a three-dimensional corrugated profile "a doctor blade 142 wipes peripheral surface 140 of gravure roll 138 clean, leaving the adhesive compound only in the pits on the surface of gravure roll 138".

U.S. Pat. No. 4,806,183 to Williams discloses a "Method of and apparatus for controlling application of glue to defined areas" including a means to apply adhesive were said application roll contains cells and in claim 12 identifies a gravure roll as the application roll "doctor means doctors substantially all of the adhesive off of said application roll peripheries except for adhesive in said cells".

U.S. Patent Application Publication No. 2002/0108563 A1 to Yoshida discloses a two roll reverse coating system designed to apply a fluent coating directly to the surface of the work or substrate in a web coating application where the direction of the work or substrate being coated is traveling in the opposite direction of the application roll.

Disclosed in an article published in 1998, by Cambridge University Press "An experimental investigation of meniscus roll coating" describes a process utilizing a complex fluent delivery system to study and better understand the flow dynamics of a fluent coating when metered between 2 precision ground stainless steel rollers utilizing precision bearings with a surface roughness value out 0.4 µm.

The apparatus described above requires intimate or near intimate contact "kiss contact" to transfer the fluent coating from the application roll to the work or substrate. In both reverse and direct gravure the volume of said fluent coating is determined by the size, shape, angle and land area between cells. In order to extract the fluent coating from the cells, pressure created by the back-up roll is required. When attempting to coat a three-dimensional object the pressure required to affectively extract the adhesive from the gravure cells results in the adhesive flowing off the surface onto the sides of, and between said three-dimensional elements, or on the floor between same.

In the case of a Reverse Roll system, the application roll rotates in the reverse direction of the web and requires a "zero or near zero gap" between the application roll and the back-up roll that supports the work or substrate being coated to effect the transfer of the fluent coating onto said work or substrate. In both the Reverse Roll and Reverse Gravure, the reverse direction of the application roll with respect to the web direction combined with the "zero or near zero gap" requirements of the process results in the deposition of the fluent coating to flow and reside primarily on the side walls or on the floor between said three-dimensional elements.

This invention is to apply adhesive to the protrusion tips on a sheet of elastomeric material (cushion) that serves as a shock absorber and cushion for use between a flexographic printing plate and a printing cylinder during printing for compensating for variations in thickness, height and centricity of the printing cylinder and flexographic printing plate to prevent distortions in the image being printed that includes providing an elastomeric sheet having a longitudinal direction in the direction of circumferential travel of the cylinder circumference that includes a plurality or array of protrusions formed of the elastomeric material of predetermined cross-sectional shape and area and the material having a durometer to cushion the flexographic plate in such a way to provide the necessary compensation to ensure a high quality printed image at high speed.

SUMMARY OF THE INVENTION

The method and system of this invention provide for applying and coating a cushion with adhesive for mounting the cushion between a plate cylinder surface and a flexographic plate surface as described in U.S. Pat. No. 6,247,403. The adhesive is applied to the tips of the protrusions that make up the structure of the cushion.

The cushion is typically mounted between the plate cylinder surface and the flexographic plate base. The cushion may be glued to the cylinder surface and to the flexographic plate surface.

Accordingly, it is the objective of the present invention to provide the apparatus and process required to consistently and uniformly apply a heavy deposition of said fluent coating whereby the majority of the deposition of said fluent coating resides on the upper/outer most surface of the three-dimensional work or substrate being coated resulting in a coat weight of 50% or greater then prior art coating apparatus.

Another objective of the present invention is to provide a process capable of said deposition without masking or the use of any other devices to prevent the flow of the fluent coating down the side walls of said three-dimensional object or to be deposited in between the three-dimensional elements.

A further objective of the present invention is to coat said three-dimensional work or substrate regardless of gauge or their orientational relationship to the traveling direction of the web.

An additional objective of the present invention is to provide for the necessary apparatus required to meter a precise wet film thickness on the application roll at a controlled thickness being uniformly distributed on the application roll in both the rotational direction and horizontal plane of said application roll. It is also necessary to provide a means of support of the traveling web whereby the precise distance between the work or substrate surface can be adjusted to control the depth in which said three-dimensional object is submerged into the wet film thickness of the application roll. Additionally, it is necessary for the three-dimensional elements on the traveling web to be immersed into the wet film surface metered onto the application roll with the orientation of said three-dimensional elements being inverted at the point of contact when coming into contact with the fluent wet film thickness of the application roll. It is most preferable that the contact point of said three-dimensional element into the fluent coating occur in the upper half of the diameter of the application roller.

Another object of the present invention is to mitigate the pressure created with a transfer/backup roll configuration common on most web based coating lines and the resulting pressure on said three-dimensional work or substrate thereby eliminating the resulting adverse affect wherein said fluent transferred flows to the side walls and does not result in the majority of said fluent coating to reside on the tip or upper/outer most surface of the work or substrate being coated. The present invention is designed to accurately and consistently coat a three-dimensional object with a Shore-A durometer of 10 or greater in the web form. In general, coating requirements are broad in regard to coat weight and tolerances and vary industry-by-industry, product-by-product, largely dependent and linked to the fluent characteristics including the metering method. FIG. 1 is designed for the specific characteristics of the coating requirements of the art FIG. 2. 11 identified in U.S. Pat. No. 6,247,403 B1. It is also the intent of the present invention to provide alternative designs of the present invention for the same process created herein, whereby the said alternatives will meter the fluent coating and dipping roller configurations making the process readily adaptable for the coating of other three-dimensional work or substrate.

Another object of the present invention is to provide various dipping roll configurations specifically designed to provide a range of surface contact area at the point in which the work or substrate comes in contact with the fluent coating.

An additional objective of the present invention is in part based upon the specific requirements of the work or substrate FIG. 2. 11 produced under U.S. Pat. No. 6,247,403 B1, where said three-dimensional objects are elastomeric and are continuous in form on the base material which are essentially parallel strips, in a parallel array, and spaced apart by a predetermined distance on a 45° angle in relationship to the traveling web. The present invention eliminates the mechanical pressure associated with other coating processes resulting with the primary deposition of the fluent coating settling on the tip or upper/outer most surface of said parallel array of three-dimensional elements.

The following drawings, apparatus, descriptions and tolerances are designed to create a attraction of the fluent coating to the said three-dimensional object being coated in the manner set forth in the descriptions above including but not limited to the utilization of surface tension, adhesion, cohesion, capillarity, capillary attraction, capillary action and vacuum extraction of the fluent in conjunction with the said three-dimensional object being coated.

BRIEF DESCRIPTION OF THE DRAWINGS

FIGS. 1-A & 1-B depict a three-dimensional membrane identified in U.S. Pat. No. 6,247,403 B1, coated with a fluent coating containing a blue die using a direct gravure method set for optimum transfer.

FIGS. 2-A & 2-B depict a three-dimensional membrane identified in U.S. Pat. No. 6,247,403 B1, coated with a fluent coating containing a blue die using a direct gravure method, increasing the pressure from the supporting backup roll in an effort to increase the fluent adhesive coating transfer.

FIGS. 3-A & 3-B depict a three-dimensional membrane identified in U.S. Pat. No. 6,247,403 B1, coated with a fluent coating containing a blue die using the apparatus and coating process of the present invention.

FIG. 1 is an overall cross sectional view of the apparatus required to accurately and precisely deposit a fluent coating to the tip of said three-dimensional shapes that are required to be continuously coated in a web application.

FIG. 2 is a cross sectional view of a refined embodiment for the metering of said fluent coating onto the application roll, incorporating an enclosure which provides a higher level of control when monitoring and maintaining the fluent coating properties.

FIG. 3 is a cross sectional view of an alternative embodiment for the metering of said fluent coating on to the application roll.

FIG. 6 is a cross sectional view of an alternative embodiment in which the dipping roll is significantly different in diameter than the application roll.

FIG. 7 is a cross sectional view of an alternative embodiment in which the dipping roll is positioned between two web path rolls.

DETAILED DESCRIPTION OF THE DRAWINGS

Figure 4:
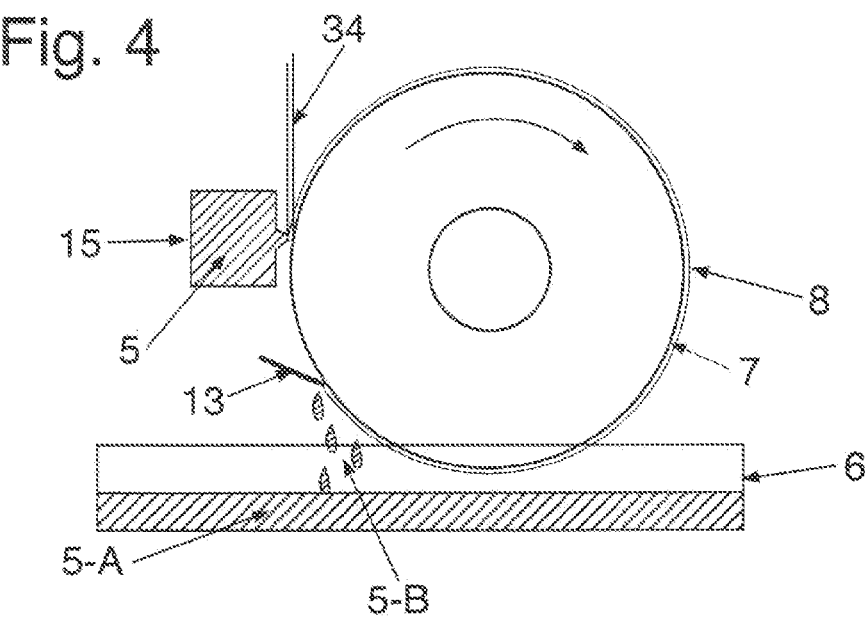
FIG. 4 is a cross sectional view of an alternative embodiment providing for greater tolerances for the metering and maintaining the fluent coating properties of said fluent coating onto the application roll.

FIG. 1-A, is a cross-sectional micrograph of the three-dimensional membrane identified in U.S. Pat. No. 6,247,403 B1, coated with a fluent coating containing a blue die using a direct gravure method set for optimum transfer. Wherein, 37 is the upper/outer most surface (tip) of the three-dimensional object being coated, which clearly shows the resulting fluent coating deposition is not primarily deposited on said upper/outer surface (tip) of said three-dimensional object. Wherein, 38 depicts the results of the fluent coating deposition resulting from the back-up roll pressure required to extract the fluent coating from the pits in the engraved anilox, in which the majority of the fluent coating resides at the converging point alongside the upper/outer most tip and primarily on the sidewalls of said three-dimensional object.

FIG. 1-B, is a top down perspective micrograph of the three-dimensional membrane identified in U.S. Pat. No. 6,247,403 B1, coated with a fluent coating containing a blue die using a direct gravure method set for optimum transfer. Wherein, 39 is the upper/outer most surface of the three-dimensional object being coated, which clearly shows the resulting fluent coating deposition is not primarily deposited on said upper/outer surface (tip) of said three-dimensional object. Wherein, 40 depicts the results of the fluent coating deposition resulting from the back-up roll pressure required to extract the fluent coating from the pits in the engraved anilox, in which the majority of the fluent coating resides at the converging point alongside the upper/outer most tip and primarily on the sidewalls of said three-dimensional object.

FIG. 2-A, is a cross-sectional micrograph of the three-dimensional membrane identified in U.S. Pat. No. 6,247,403 B1, coated with a fluent coating containing a blue die using a direct gravure method increasing the pressure from the supporting backup roll in an effort to increase the fluent adhesive coating transfer. Wherein, 41 is the upper/outer most surface (tip) of the three-dimensional object being coated, which clearly shows the resulting fluent coating deposition is not primarily deposited on said upper/outer surface (tip) of said three-dimensional object. Wherein, 42 depicts fluent coating voids in areas on the upper/outer (tip) resulting from the increased pressure applied to the work or substrate from the back-up roll required to extract the fluent coating from the pits in the engraved anilox. Wherein, 43 depicts the majority of the fluent coating transferred resides at the converging point along the sidewalls and on the floor between said three-dimensional objects.

FIG. 2-B, is a top down perspective micrograph of the three-dimensional membrane identified in U.S. Pat. No. 6,247,403 B1, coated with a fluent coating containing a blue die using a direct gravure method increasing the pressure from the supporting backup roll in an effort to increase the fluent adhesive coating transfer. Wherein, 44 depicts fluent coating voids in areas on the upper/outer (tip) resulting from the increased pressure applied to the work or substrate from the back-up roll required to extract the fluent coating from the pits in the engraved anilox. Wherein, 45 depicts the majority of the fluent coating transferred resides at the converging point along the sidewalls and on the floor between said three-dimensional object. Wherein, 46 is the upper/outer most surface of the three-dimensional object being coated, which clearly shows the resulting fluent coating deposition is not primarily deposited on said upper/outer surface (tip) of said three-dimensional object.

FIG. 3-A, is a cross-sectional micrograph of the three-dimensional membrane identified in U.S. Pat. No. 6,247,403 B1, coated with a fluent coating containing a blue die utilizing the apparatus of the present invention. Wherein, 47 is the upper/outer most surface (tip) of the three-dimensional object being coated, using the dipping roller configuration in conjunction with the metered wet film thickness on the application roller which clearly shows the resulting fluent coating deposition is primarily deposited on said upper/outer surface (tip) of said three-dimensional object. Wherein, 48 depicts a significant increase in the volume of fluent coating being transferred as a result of the dipping roller configuration in conjunction with the metered wet film thickness on the application roller in which the majority of the fluent coating resides on the upper/outer most tip of said three-dimensional object.

FIG. 3-B, is a top down perspective micrograph of the three-dimensional membrane identified in U.S. Pat. No. 6,247,403 B1, coated with a fluent coating containing a blue die utilizing the apparatus of the present invention. Wherein, 49 is the upper/outer most surface (tip) of the three-dimensional object being coated, using the dipping roller configuration in conjunction with the metered wet film thickness on the application roller which clearly shows the resulting fluent coating deposition is primarily deposited on said upper/outer surface (tip) of said three-dimensional object. Wherein, 50 depicts a significant increase in the volume of fluent coating being transferred as a result of the dipping roller configuration in conjunction with the metered wet film thickness on the application roller in which the majority of the fluent coating resides on the upper/outer most tip of said three-dimensional object, with just trace amounts of fluent deposition on the side walls of said three-dimensional object.

Referring now to the drawings, and in particular FIG. 1, the present invention is the preferred embodiment. The apparatus is comprised of the following elements, 4 a metering device that is a doctoring blade used to create a precise wet film thickness along the longitudinal direction of 7 the application roll, identifying this as 1 the $1^{st}$ metering point which is partially submerged in 5 the fluent of 6 said reservoir in which 5 the fluent coating is monitored and maintained. Wherein 8-A depicts the fluent prior to being metered using element 4 which results in a uniform wet film thickness 8 wherein 9 is a roller with the same diameter as 7, rotating in the same direction as 7. 9 the dipping roller is attached to the apparatus horizontally and vertically disposed in alignment with 7 and the horizontal plane of 9 is adjustable up and down and whereby the resulting gap 2 is designed to be a $2^{nd}$ metering point.

A specific variable in FIG. 1 is 1 the $1^{st}$ metering point which consist of the converging angles of 4 and 7 where it is necessary to accurately set the distance or gap 1 between 4 and 7, and the angle in which 4 the doctoring blade is positioned relevant to 7 must be adjustable to allow a contact angle of between + or −45° of perpendicular. 4 the doctoring blade must be of sufficient rigidity to accurately and uniformly meter the fluent coating being used. To determine the exact specifications for a particular coating a minimum of the following subset of data points must be calculated; viscosity, specific gravity, maximum line speed, horizontal width of 4 the doctoring blade from which a calculation for deflection can be obtained. To determine the tolerance of 4 the doctoring blade you need to work backwards since any deviation in 4 doctoring blade tolerance will be amplified when other machine and substrate variations are taken into consideration. Therefore 4 a doctoring blade tolerance greater than 0.001" is typically required.

FIG. 2 shows an alternative preferred embodiment whereby 14 is the reservoir for applying 5 fluent coating to 7 the application roll, and 14 is positioned directly under 4 the doctoring blade and runs longitudinally along the entire length of 7 wherein the distance between 4 and 7 create 3 the $1^{st}$ metering point. Wherein 12 is a flexible doctor blade attached to the bottom of 14, running continuous in length, along the longitudinal direction and acts as a seal to maintain the volume of fluent coating in 14. Whereby 13 is a rigid scraper blade running continuous in length along the longitudinal direction of 7 and serves to removes 8 the fluent coating 5-B from 7 succeeding 21 the transfer point of the fluent coating onto 11 the work or substrate, prior to 3 the $1^{st}$ metering point. 14A is an opening positioned at the top of 14 and runs continuous in length in the longitudinal direction of 14 said reservoir and provides a means of overflow 5-A of 5 said fluent coating into 6 a drip pan longitudinally disposed along 7 and is designed to capture the resulting discharge 5-B from 13 and 14A.

Also shown in FIG. 2, is 10 the opposing side of the web wherein on its face 11 is a three-dimensional element traveling at the same rate of speed as 7 as it is partially submerged 21 into the meter surface 8, the fluent coating 11-A is the result of said capillary attraction of 21. The metered fluent coating process results in 11-A the majority of the wet film deposition residing primarily on the upper/outer tip (inverted in illustration and during coating) of 11, said three-dimensional object.

Also shown in FIG. 2, is a specific variable in, (FIGS. 1, 3) the $2^{nd}$ metering point created by setting the distance between 7 the application roll and 9 the dipping roller. The present invention is intended to coat primarily the tip 11-A of a three-dimensional object 11 with varying durometers relying upon 8 the metered fluent coating wet film thickness to be greater than the required penetration of 11 said three-dimensional object into 8 the metered fluent wet film thickness, wherein 21 shows the dipping/transfer point. Wherein 8 the preferred wet film thickness is 50% or greater than depth of penetration of the work or substrate into the wet film thickness as it is being dipped into 8 and is required to be at least 10% greater than the depth of penetration of 11. In order to accomplish this, the specific variable needs to be calculated based on the combined thickness of 10 and 11 (i.e. total thickness of the work or substrate being coated) and the required depth of penetration of 11 said three-dimensional object into 8 the metered fluent on 7 the application roll. Example, gauge or thickness of 10 & 11 work or substrate (i.e. 0.020"), desired penetration into 8 the metered fluent wet film thickness (i.e. 0.010"), with an average penetration into 8 the metered wet film thickness of 50% of said volume requires the following calculation to determine the correct gap for work or substrate of 0.020" thick (web thickness): +0.010" (penetration into the fluent wet film thickness)+0.010" (for an average penetration into the wet film thickness of 50%) requires a gap of 0.040" between the dry surface of 7 and 9.

FIG. 3 shows an alternative embodiment whereby 16 is a metering roll that is longitudinally disposed both horizontally and vertically in alignment with 7 the application roll in which runs in the reverse direction of 7, and 16 is adjustable in and out and whereby the resulting gap 33 is designed to be a $1^{st}$ metering point, and is positioned as close as practical to (FIG. 2) 21 the intersection of (FIGS. 2) 8 and 9 in which said dipping action of the work or substrate being coated occurs. Wherein 6 is an open reservoir that also serves as a drip pan to capture the residual 5-B of which also contains 5 the fluent coating running continuous in length, along the longitudinal direction of 7 the application roll in which 7 is partially submerged into 5 and provides an unmetered point of transfer of 5 resulting in 8A. 17 is the excess of 5 fluent coating subsequent to the metering of said fluent coating onto 7, resulting in 8 a uniform wet film thickness. Whereby 13 is a rigid scraper blade running continuous in length along the longitudinal direction of 16 and serves to removes 8A said excess fluent coating from 16 succeeding the metering point of the fluent coating onto 7 the application roller.

FIG. 4 shows an alternative embodiment whereby 15 is a slot die in which the output volume creates the $1^{st}$ metering point is longitudinally disposed both horizontally and vertically in alignment with 7 the application roll and is positioned as close as practical to the intersection of (FIG. 2) 21 the intersection of (FIGS. 2) 8 and 9 in which said dipping action of the work or substrate being coated occurs. Wherein the distance between 15 and 7 creates 34, the $2^{nd}$ metering point. Wherein 6 is an open reservoir positioned under 7 that serves as a drip pan to capture 5-A the residual fluent coating which runs continuous in length, along the longitudinal direction 7. Wherein 8 the resulting wet film thickness is controlled as a combined result of 15 the output die volume and 33 the distance between 15 and the rotational speed of 7. Whereby 13 is a rigid scraper blade running continuous in length along the longitudinal direction of 7 and serves to remove 5-B said excess fluent coating from 7 succeeding the metering point of the fluent coating prior to the next full rotation of 7.

Figure 5:
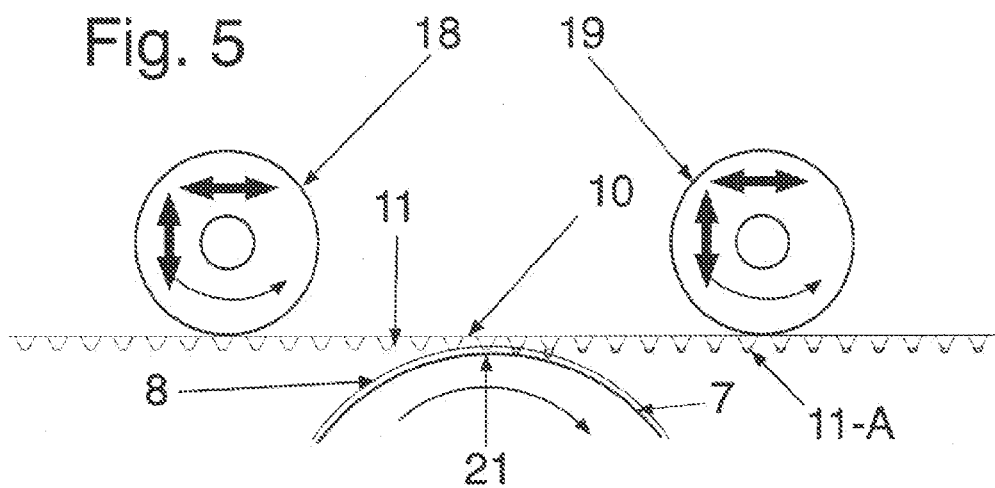
FIG. 5 is a cross-sectional view of an alternative embodiment to the single dipping roller configuration.

FIG. 5 shows an alternative embodiment whereby 18 and 19 in combination are a substitute for (FIG. 1), 9 and provide for a maximum working plane in which 10 the web is suspended over 7 the application roll during 21 the dipping action. Whereby the plane of the web is held taught by a web tension control system and 18 and 19 rotate in the same direction as 7 and are configured with the ability to move closer to each other or further apart independent of one another end upwards or downwards independent of one another resulting in the ability to provide significant control in both the contact point, contact angle and depth of penetration into 8 at 21 the dipping point of the fluent coating onto (FIG. 2), the tip 11-A of the work or substrate 11.

FIG. 6 shows an alternative embodiment whereby 20 is a substitute for (FIG. 1) 9 and is configured with the ability to move upwards or downwards resulting in a small footprint at 21 in which 10 the web is suspended over 7 the application roll during 21 the dipping action providing for a reduced footprint of the element being dipped in 8 the fluent coating. 22 illustrates the split of 8 the metered wet film thickness as 11 the tip of the three-dimensional element exits 8 the fluent coating resulting in 11-A the capillary attraction of 8 whereby 11 is extracted from 8 and results in a high coat weight primarily residing on 11-A the tip of said three-dimensional elements.

FIG. 7 shows an alternative embodiment whereby 20 is a substitute for (FIG. 1) 9, with the ability to move up or down in combination with 35 and 36 which are configured with the ability to move closer to each other or further apart independent of one another and upwards or downwards independent of one another resulting in the ability to provide significant control in both the contact point and contact angle providing for a minimum working plane resulting in a small footprint at 21 in which 10 the web is suspended over 7 the application roll during 21 the dipping action providing for a minimum surface area being dipped in 8 the fluent coating.

Figure 8:
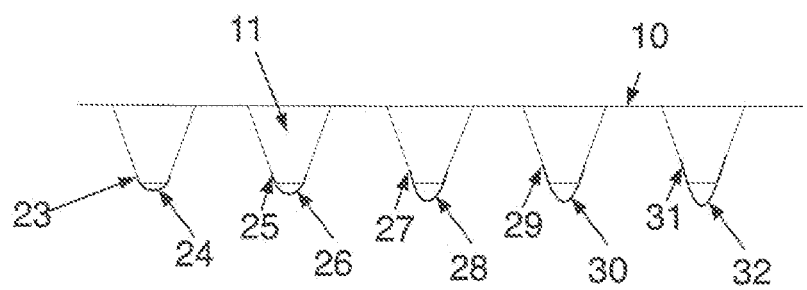
FIG. 8 is a cross-section of a three-dimensional element illustrating the effect of when said three-dimensional elements are submerged into the fluent on the application roll at varying depths.

FIG. 8 shows the varying deposition of (FIG. 2) 8 the fluent coating onto 11 the work or substrate as a direct result of (FIG. 2) 21 the depth in which 11 is submerged into (FIG. 2) 8. 23 shows a minimum penetration into (FIG. 2) 8 resulting in 24 a minimal deposition at the tip of 11. 25 shows an increased penetration vs. 23 into (FIG. 2) 8 resulting in 26 a deposition greater than 24 but less than 28. 27 shows an increased penetration vs. 25 into (FIG. 2) 8 resulting in 28 a deposition greater than 26 but less than 30. 29 shows yet a further increased penetration vs. 27 into (FIG. 2) 8 resulting in 30 a deposition greater than 28 but less than 32. 31 shows the deepest penetration into (FIG. 2) 8 resulting in 32 a deposition greater than 30. Based on work to date there is a maximum penetration which if exceeded could result in a flooding of the web at it surface by (FIG. 2) 8 the fluent coating, however such a phenomenon is not necessarily restricted to a single setting (i.e. dipping depth), there are many factors that contribute to this effect including line speed, viscosity of (FIG. 2) 8 the fluent coating, input angle and exit angle of the three-dimensional object, the rheology of (FIG. 2) 8 the fluent coating, the surface tension of 11 said three-dimensional object, and other factors. Were by the fluent coating depicted in image 3-A & 3-B, and (FIG. 2) 8 is a solvent based, pressure sensitive, acrylic adhesive that is comprised of 52% solids and 48% solvent, coated at a viscosity range of between 3000 & 7000 cP in order to achieve a final dry coat weight greater than 0.0005", but less than 0.0035".

The method and system of this invention provide for applying and coating a cushion with adhesive for mounting the cushion between a plate cylinder surface and a flexographic plate surface as described in U.S. Pat. No. 6,247,403. The adhesive is applied to the tips of protrusions that make up the structure of the cushion.

The cushion is mounted between the plate cylinder surface and the flexographic plate base. The cushion may be glued to the cylinder surface and to the flexographic plate surface.

What is claimed is:

1. A method for applying precise coating deposition of a fluid adhesive coating on a three dimensional moving elastomeric cushion having an array of parallel longitudinal protrusions on one side, comprising the steps of:
   providing at least one vessel containing as an open reservoir a fluid adhesive material having a known viscosity;
   providing a cylindrical application roll having a center axis and having a nonporous surface such that the surface of the application roll is partially submerged in the fluid adhesive material;
   aligning a metering device defined as a doctoring blade with the application roll such that when the application roll rotates about its center axis in a coating direction and fluid adhesive material covers a portion of the surface of the application roll, the fluid adhesive material on the application roll is adjusted as necessary to create a predetermined uniform wet film thickness of fluid adhesive material on the application roll; and
   rotating the application roll about its center axis in the coating direction; and
   tensioning and moving the elastomeric cushion to travel above the application roll in a straight line plane horizontally at a predetermined speed of the application roll while engaging a portion of the cushion longitudinal protrusions facing downwardly to coat a portion of the fluid adhesive continuously on the cushion protrusions tips thereby coating a portion of the longitudinal protrusions tips with fluid adhesive.

2. The method of claim 1, adjusting the cushion longitudinal protrusion tips coating penetration in the fluid adhesive film thickness wherein the fluid adhesive material on the application roll is adjusted as necessary to create a predetermined uniform wet film thickness greater than the depth of penetration of said cushion longitudinal protrusions tips into the fluid adhesive material on the application roll.

3. The method of claim 1, additionally comprising the step of providing a moving cushion adjustment above the application roll that precisely controls the depth of penetration of said cushion longitudinal protrusions tips into the coating on the application roll and provides the necessary means of support for the moving cushion protrusions that are being coated.

\* \* \* \* \*